(12) United States Patent
Klein et al.

(10) Patent No.: US 10,465,827 B2
(45) Date of Patent: Nov. 5, 2019

(54) PLUG-IN CONNECTOR FOR FLUID LINES WITH INNER ADAPTER SLEEVE

(71) Applicant: VOSS AUTOMOTIVE GMBH, Wipperfurth (DE)

(72) Inventors: Roland Klein, Wipperfurth (DE); Eugen Heinrichs, Bergneustadt (DE)

(73) Assignee: VOSS Automotive GmbH, Wipperfurth (DE)

( * ) Notice: Subject to any disclaimer, the term of this patent is extended or adjusted under 35 U.S.C. 154(b) by 310 days.

(21) Appl. No.: 15/315,303

(22) PCT Filed: Apr. 1, 2015

(86) PCT No.: PCT/EP2015/057243
§ 371 (c)(1),
(2) Date: Nov. 30, 2016

(87) PCT Pub. No.: WO2015/180875
PCT Pub. Date: Dec. 3, 2015

(65) Prior Publication Data
US 2017/0152979 A1 Jun. 1, 2017

(30) Foreign Application Priority Data
May 30, 2014 (DE) .................. 10 2014 107 655

(51) Int. Cl.
*F16L 37/098* (2006.01)
(52) U.S. Cl.
CPC .............. *F16L 37/0985* (2013.01)

(58) Field of Classification Search
CPC ... F16L 37/096; F16L 37/098; F16L 37/0982; F16L 37/0985; F16L 37/0987; F16L 37/12; F16L 37/122; F16L 37/1235; F16L 37/133
USPC .......................... 285/305, 319, 86
See application file for complete search history.

(56) References Cited

U.S. PATENT DOCUMENTS

| | | | | |
|---|---|---|---|---|
| 2,485,763 A * | 10/1949 | Moon | ...................... | E21B 17/04 285/112 |
| 3,782,840 A * | 1/1974 | Brishka | ..................... | F16B 7/00 403/361 |
| 5,915,738 A * | 6/1999 | Guest | .................. | F16L 37/0982 285/24 |
| 6,349,978 B1 * | 2/2002 | McFarland | ......... | F16L 37/0985 285/319 |
| 7,878,552 B2 * | 2/2011 | Freter | .................. | F16L 37/098 285/308 |
| 9,115,837 B2 * | 8/2015 | Barthel | ................. | F16L 37/252 |
| 10,012,335 B2 * | 7/2018 | Dude | .................. | F16L 37/0985 |
| 2007/0040377 A1 | 2/2007 | Moretti et al. | | |

(Continued)

FOREIGN PATENT DOCUMENTS

DE 102011084988 A1 4/2013

*Primary Examiner* — Aaron M Dunwoody
(74) *Attorney, Agent, or Firm* — Eric J. Sosenko; Jonathan P. O'Brien; Honigman LLP

(57) ABSTRACT

A plug-in connector assembly for connecting at least one fluid line to another fluid line or to an aggregate connection. The plug-in connector assembly includes, a housing, a mating plug-in connector and an adapter sleeve. The mating plug-in connector and the adapter sleeve are received within a sleeve section of the housing, with the adapter sleeve operating to attach the mating plug-in connector to the housing in a releasable manner.

23 Claims, 7 Drawing Sheets

(56) References Cited

U.S. PATENT DOCUMENTS

| | | | |
|---|---|---|---|
| 2008/0246274 A1 | 10/2008 | Feger et al. | |
| 2009/0035055 A1* | 2/2009 | Rosch | F16L 37/0982 403/314 |
| 2010/0148491 A1* | 6/2010 | Takenaka | F16L 37/0985 285/24 |
| 2014/0125051 A1 | 5/2014 | Barthel et al. | |
| 2014/0197629 A1* | 7/2014 | Barthel | F16L 37/0985 285/93 |
| 2014/0319823 A1* | 10/2014 | Happich | F16L 37/10 285/309 |
| 2015/0021902 A1* | 1/2015 | Kury | F16L 37/0985 285/93 |
| 2015/0145243 A1* | 5/2015 | Dude | F16L 37/0982 285/308 |
| 2017/0152980 A1* | 6/2017 | Klein | F16L 37/0985 |

\* cited by examiner

PLUG-IN CONNECTOR FOR FLUID LINES WITH INNER ADAPTER SLEEVE

CROSS-REFERENCE TO RELATED APPLICATIONS

This application is the U.S. national phase of International Application No. PCT/EP2015/057243 filed on Apr. 1, 2015, and claims priority to DE 10 2014 107 655.9, filed May 30, 2014, the disclosures of which are incorporated in their entirety by reference herein.

TECHNICAL FIELD

The present invention relates to a plug-in connector.

BACKGROUND

A plug-in connector generally of the kind to which the present invention relates is known from German patent DE 10 2008 013 565 A1.

The locking arms reach therein with their locking cams behind the annular collar of an inserted mating plug-in connector. The locking arms each have therefor a radially outwardly directed graded section, at whose free end is located the respective locking cam. In this way is obtained an enlarged diameter of the plug-in connector, so that the required installation space must be accordingly enlarged. In order to keep the length of the plug-in connector as small as possible, it is also necessary to provide axially running opening areas for accommodating the graded section with enlarged diameter, whereby the penetration of dirt particles is facilitated when the adapter sleeve is not plugged in. There is, moreover, a risk that an undesirable release can occur when the mating plug-in connector is plugged together, since the operating sections that project over the periphery of the sleeve section are easy to access.

From patent DE 10 2011 084 988 is known a plug-in connector, in which the positive locking means located at the free end of the locking arms are formed on the outside thereof. The locking cams are likewise located on the lower side of these locking arms, so that the locking cams are located within the sleeve section. This arrangement and configuration of the positive elements and the locking cams require, on the one hand, a relatively elongated design of the sleeve section, and furthermore a relatively large section is located within the wall of the sleeve section, so that the locking arms are unprotected, and dirt can furthermore easily penetrate into the sleeve section.

SUMMARY

It is an object of the present invention to prevent the disadvantages of the existing generic plug-in connector and to create a plug-in connector with very compact measurements, which ensures the total elasticity and flawless operation of the locking means within crowded installation conditions and makes possible a protected arrangement of the locking arms. An effective safeguarding of the locked position of the locking arms should at the same time be possible.

The mating plug-in connector according to the principles of the present invention has a locking groove configured in the area of a plug shaft, into which the locking cams of the locking arms engage when the mating plug-in connector is plugged together. It is possible in this way, according to the invention, to limit the diameter of the adapter sleeve in the area of its annular collar in such a way that the outer diameter of the annular collar is not greater than the outer diameter of the sleeve section of the housing. An impairment of the elastic locking arms and damage thereof is prevented in this way even in a very crowded space conditions. According to the principles of the present invention, the adapter sleeve is essentially circumferentially protected within the housing, and the locking means are not a component of the housing, but the locking means are instead configured on the separate part of the adapter sleeve, which is inserted into the housing. It is thus possible to manufacture the adapter sleeve and the housing from different materials. The positively locking elements likewise make possible an axial fixation, especially a circumferential fixation, since they can be suitably positive-lockingly fixed in peripheral direction in the adapter sleeve. The adapter sleeve cannot be released via tensile stress as a result of the positive locking in the axial direction, and a twisting of the adapter sleeve is also prevented as a result of the positive locking in the peripheral direction.

It can be advantageous according to the invention if the adapter sleeve has an annular collar that runs along the periphery of its rear opening edge seen from the direction of insertion, which is arranged outside of the sleeve section with the adapter sleeve in the inserted condition, wherein also the locking cams likewise run outside of the sleeve section. It may be advantageous according to the invention if the locking arms, which are offset by 180° with respect to each other, are provided on the adapter sleeve. The annular collar advantageously has a circular shape and its outer diameter is equal in size to an outer diameter of a circular shaped peripheral contour of the sleeve section of the housing. The annular collar thus does not project beyond the outer contour of the sleeve section, whereby a very compact design is obtained.

The annular collar is suitably connected to the locking arms in the area of the locking cams and is separated by means of circumferential gap sections from the housing of the adapter sleeve. It is advantageous according to the invention if the annular collar is provided centrally between the locking arms with deformation sections, which can be deformed in such a way under a force directed toward the longitudinal center axis, that a radially outwardly directed spreading of the locking arms is produced in such way that the radial distance of the locking cams is equal to the inner diameter of the passage opening. The configuration of the annular collar according to the invention makes possible manual release of the inserted mating plug-in connector.

According to this invention, it can likewise be advantageous if the annular collar has an oval shape, wherein its largest outer diameter is configured in the area of the operating sections and the annular collar, and its smallest diameter is configured in the area of the locking arms, and the largest outer diameter is greater than the outer diameter of the circular shaped peripheral contour of the sleeve section, and its smallest outer diameter is smaller than the outer diameter of the sleeve section. The locking arms are thereby radially inwardly deformed at their ends that face toward the cams in such a way that their radial distance to the longitudinal center axis is smaller than the inner radius of the passage opening, so that the annular collar has a circular shaped peripheral contour, whose outer diameter is smaller than/equal to the outer diameter of the sleeve section, in the locking position of the locking cams.

It is also advantageous according to the invention if the thickness of the locking arms is less than the wall thickness of the adapter sleeve, so that a stepped surface running radially in the direction of the longitudinal center axis is configured between the outer periphery of the wall of the adapter sleeve and the locking arms. It is advantageous hereby if the dimensions of the radial height of the stepped surface and the length of the locking arms within the sleeve section are such that a radially outwardly directed spring path of the locking cams is provided in such a way that the radial distance of the radially outwardly spread locking cams is at least equal to an inner diameter of the adapter sleeve and at least equal to the outer diameter of the plug shaft of the mating plug-in connector.

It is furthermore advantageous according to the invention if the locking extensions are formed by a radially elastically bendable arm that runs parallel to the longitudinal center axis, wherein the locking extensions are arranged diametrically opposite to each other and are offset by 90° with respect to the locking arms and have radially outwardly projecting locking cams at their free ends in insertion direction.

It is advantageous if the locking arms are separated by a U-shaped slot from the wall of the adapter sleeve and are connected as one piece to the wall of the adapter sleeve by means of the end that faces opposite the direction of insertion. The adapter sleeve can thus be configured short and compact. The radial elasticity of the arms can be adjusted by modifying their length and thickness. It is furthermore advantageous if the locking cams of the locking arms rest with their free ends on a circular periphery, whose diameter is smaller than the outer diameter of the sleeve section and is larger than the inner diameter of the channel section of the sleeve section. The locking arms do not project hereby beyond the outer periphery of the sleeve section, whereby on the one hand damage to the locking cams is prevented and on the other hand the compact design of the plug-in connector according to the invention is supported.

As a result of the configuration and arrangement according to the invention, the locking arms can be bent apart outwardly in the area of the locking cams during insertion by the plug-in connector, so that the locking arms with the annular collar are deformed in such a way during the plug-in operation that an insertion control is provided.

It is furthermore advantageous according to the invention if a peripheral seal is arranged in front of the adapter sleeve in the passage opening of the sleeve section in the direction of insertion in order to seal a peripheral gap between an inner wall of the sleeve section and the socket shaft of the mating plug-in connector.

It is likewise advantageous if an annular shoulder for application of the peripheral seal is configured in the sleeve section at the transition of the section with expanded diameter of the sleeve section to the passage channel and the peripheral seal is encapsulated between the annular shoulder and a front face of the adapter sleeve. This arrangement according to the invention makes it possible to avoid providing undercuts either in the plug-in connector or in the mating plug-in connector in order to achieve an encapsulation of the peripheral seal. The peripheral seal is additionally protected within the sleeve section.

It can also be advantageous according to the invention to displaceably arrange a release safeguard at the outer periphery of the sleeve section in the direction of the longitudinal center axis between two locked positions, whereby the release safeguard prevents a spreading of the locking arms when in its locked position onto the annular collar and releases the locking arms for a spreading in its other opposite inserted locking position.

It is advantageous hereby according to the invention if the release safeguard is comprised of a sleeve that encloses the sleeve section, which has locking lugs facing the outer edge in the direction of insertion and lock in recesses of the peripheral wall of the sleeve section in the corresponding locked position.

The release safeguard according to the invention is characterized by a very compact space-saving design and prevents a displacement of the release safeguard before assembly of the mating plug-in connector as well as during its assembly by means of the configuration of the annular collar as oval annular in the assembly position.

Other advantageous embodiments and features of the plug-in connector according to the invention are claimed in the dependent claims, wherein the features of the individual dependent claims are essential to the invention in combination with the features of the main claim and independently from each other.

BRIEF DESCRIPTION OF THE DRAWINGS

This invention will be described in further detail with the aid of the exemplary embodiments depicted in the enclosed drawings, wherein.

Identical parts are identified with the same reference numerals in the individual figures.

DETAILED DESCRIPTION

In the subsequent description, it is explicitly claimed that the invention is not limited to all or several features of the described combinations, but each individual sub-feature of the exemplary embodiment can rather have inventive importance in connection with or in combination with other features, as well as also independently from the feature combinations.

Figure 1:
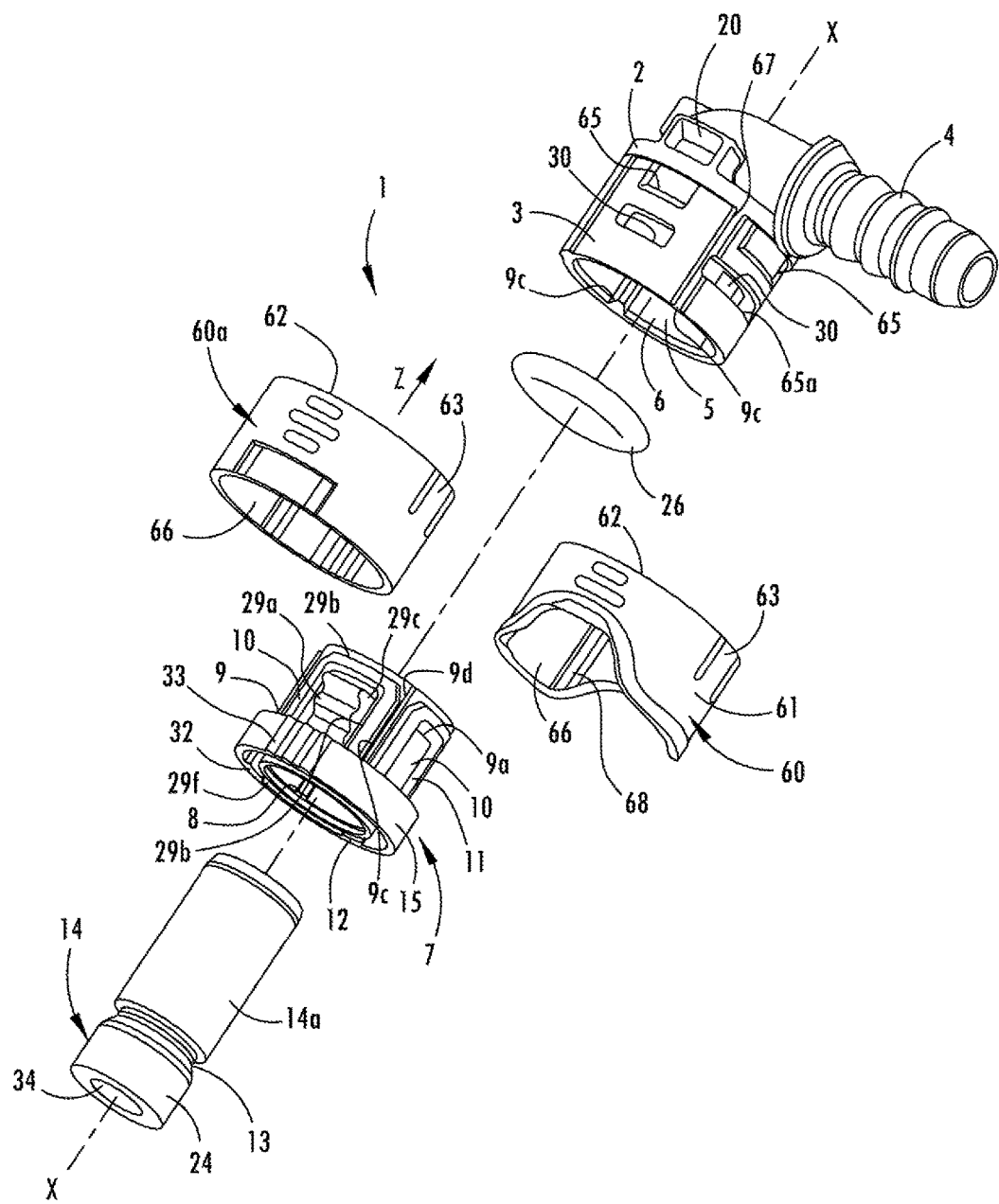
FIG. 1 shows a perspective exploded view of the connection, according to the principles of the present invention, of a plug-in connector and a mating plug-in connector with two different depictions of the displacement safeguard.

As shown in FIG. 1, the plug-in connector 1 embodying the principles of the invention has a housing 2 with a sleeve section 3 at one end. At the other end, the housing 2 has a plug-in section 4, for example for plugging into a fluid line or a line connector. This plug-in section 4 can however also be configured as a receiving section for receiving insertion of a fluid line, for example via a releasable plug connection. The housing 2 can alternatively also be connected at the other end to a unit via such a plug connection.

The plug-in connector 1 can be configured as an angular plug-in connector as shown in FIG. 1. The plug-in connector 1 can alternatively not be angled between the sleeve section 3 and the plug end section 4, so that it can be configured straight, or any angles can be present between sections 1 and 4. Also possible are T-shaped or Y-shaped plug-in connectors. The plug-in connector 1 can also be a component of a distributor housing with additional further connections for a fluid line or for a measuring connection or the like.

The housing 2 has a passage channel 5. The passage channel 5 has a channel section 6 with an especially enlarged diameter in the area of the sleeve section 3.

Figure 2:
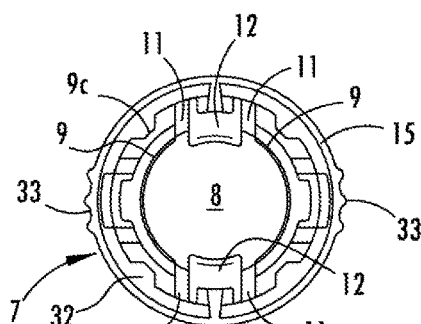
FIG. 2 shows a frontal view of an adapter sleeve embodying the principles of the present invention.

An adapter sleeve 7 is inserted into the sleeve section 3 with the enlarged diameter channel section 6 of the housing 2. This adapter sleeve 7 has an opening 8, see FIGS. 1 and 2. The adapter sleeve 7 furthermore has a sleeve wall 9, which encloses the opening 8. Locking means are configured in the sleeve wall 9 especially in two mutually diametrically opposite sections. These locking means preferably consist of two locking arms 10, which are radially elastic with respect to a longitudinal center axis X-X of the adapter sleeve 7. The locking arms 10 run, for example, parallel to the longitudinal center axis X-X and are separated from the sleeve wall 9 at their longitudinal sides by means of slot-shaped clearances 11. The locking arms 10 are connected to the sleeve wall 9 at the front end of the adapter sleeve 7 in direction of insertion Z. The locking arms 10 have in this case, preferably, a lesser thickness than the wall thickness of the sleeve wall 9, so that a stepped surface 9a running in the direction of the longitudinal center axis X-X is configured between the outer periphery of the sleeve wall 9 and the locking arms 10.

As can furthermore be seen in FIG. 1, it may be practical to configure an annular step 9b at the front end of the adapter sleeve 7 in insertion direction Z. Guide grooves 9c, whose groove base rests on the same radius around the longitudinal center axis X-X as the periphery of the annular step 9b, extend around the periphery of the adapter sleeve 7 starting from this annular step 9b. The guide grooves 9c each have a widening funnel-shaped insertion opening 9d, which expands in insertion direction Z. The guide grooves 9c serve to guide guiding ribs 9e configured along the inner wall in the interior of the channel section 6, wherein the adapter sleeve 7 is oriented in such a way that the guiding ribs 9e are inserted into the guide grooves 9c. In this way is attained a correct positioning of the adapter sleeve 7 in the channel section 6. Four guide grooves 9c offset with respect to each other by 90° are preferably configured.

Figure 4:
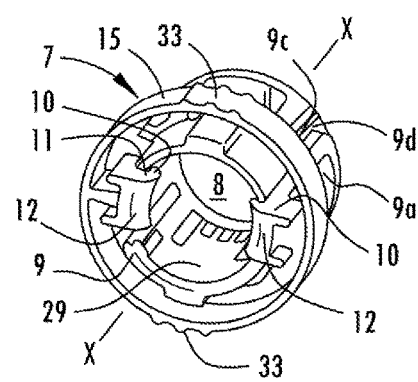
FIG. 4 shows a perspective frontal view of the adapter sleeve according to FIG. 3.
Figure 5:
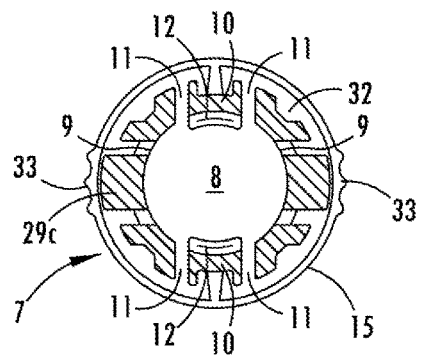
FIG. 5 shows a sectional view along section N-N in FIG. 3.
Figure 6:
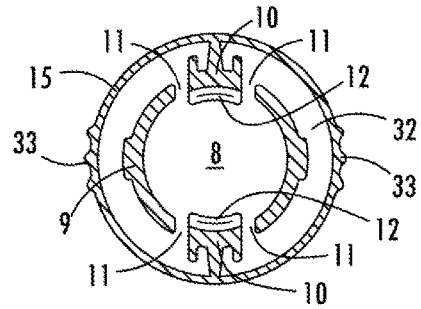
FIG. 6 shows a sectional view along section O-O in FIG. 3.
Figure 6A:
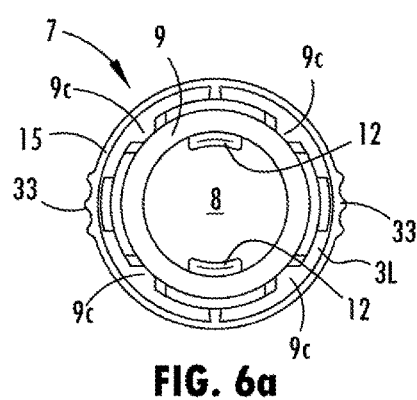
FIG. 6a shows a view of the adapter sleeve according to FIG. 3 corresponding to arrow A in FIG. 1.
Figure 10:
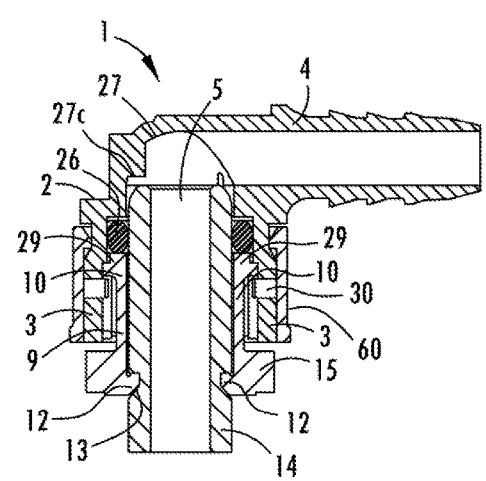
FIG. 10 shows a longitudinal section through the plug-in connection of the invention according to FIG. 1 in the inserted state of the mating plug-in connector.
Figure 11:
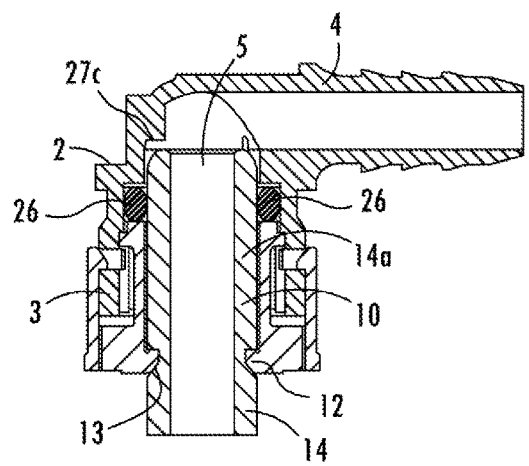
FIG. 11 shows a view according to FIG. 10 with the safeguard element displaced into securing position.
Figure 17:
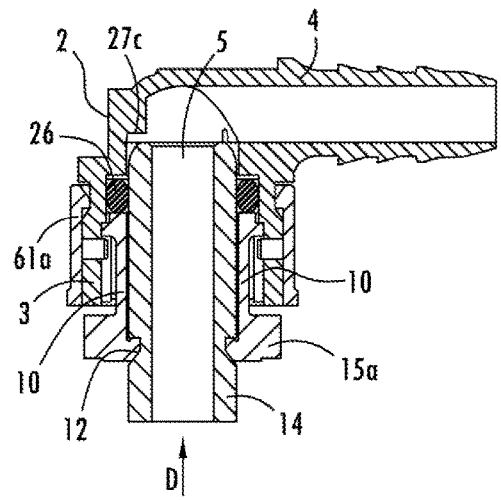
FIG. 17 shows a section through the plug-in connection of the invention according to FIG. 14 in the inserted state of the mating plug-in connector.

The locking arms 10 have, for example, locking cams 12 at their free ends, which are oriented radially in the direction of the longitudinal center axis X-X. These locking cams 12 lock into a locking groove 13 of an inserted mating plug-in 14 connector with the adapter sleeve 7 inserted into the passage opening 8; see FIGS. 10 and 17. These locking cams 12 are located outside of the sleeve section 3 with the adapter sleeve 7 inserted into the sleeve section 3. As can be seen, for example, in FIGS. 4, 7, the passage opening 8 has the same inner diameter over its entire length, so that a continuous smooth, step-free inner wall is present, which transfers over into an opening area located in the rear, particularly an angled insertion surface in the opening area of the passage opening 8 in insertion direction Z.

It can furthermore be practical if the adapter sleeve 7 has an annular collar 15 over the periphery of its passage opening 8, that is in an opening area located in the rear seen in insertion direction Z. This annular collar 15 runs radially outwardly offset with respect to the sleeve wall 9, so that its outer diameter and its inner diameter are especially larger than the outer diameter of the sleeve wall 9. The outer diameter of the annular collar 15 is suitably equally as large as that of the sleeve section 3.

The annular collar 15a is thus circumferentially separated from the adapter sleeve 7 by means of circumferential gap sections 32 between the locking arms 10. The annular collar 15 is connected on its outer side via webs to the locking arms 10 in the area of the locking cams 12 of the locking arms 10. The annular collar 15 accordingly encloses the adapter sleeve 7 in the area of the free ends of the locking arms 10. It is advantageous according to the invention if the annular collar 15 has two diametrically opposite deformation sections 33 in the center between the locking arms 10. In the area of the deformation sections, the annular collar 15 can be deformed radially inwardly by means of a force P to be applied radially from outside towards the longitudinal center axis X-X in such a way that the locking arms 10 are spread radially outwardly in such a way that their locking cams 12 are disengaged from the locking groove 13 of the plug shaft 14a of the inserted mating plug-in connector 14; see FIG. 8. The annular collar 15 adopts an oval shape as a result of this external force exerted on the deformation sections 33; see FIG. 9. Such a deformation also takes place during the insertion of the plug shaft 14a into the plug-in connector 1. Release of the mating plug-in connector 14 from the plug-in connector 1 is possible in this way. The outer diameter of the annular collar 15 is especially equal in size to the outer diameter of the sleeve section 3. The deformation sections 33 are suitably formed, for example, by rib-like projections of the annular collar 15, which are radially outwardly directed with reference to the longitudinal center axis X-X. It is practical according to the invention if the locking cams 12 have a radial distance to the longitudinal center axis X-X, which is smaller than an inner radius of the passage opening 8. It is also of further advantage, if a radial distance of the locking arms 10 with reference to the longitudinal center axis X-X is at least equal to the inner diameter of the passage opening 8 in the area adjacent to the locking arms 10.

According to the invention, the adapter sleeve 7 is positively fixed in the axial direction and preferably also in the peripheral direction within the sleeve section 3 by means of positively locking elements. These positively locking elements consist of radially elastic locking elements 29 configured over the periphery of the adapter sleeve 7 between the locking arms 10.

Figure 3:
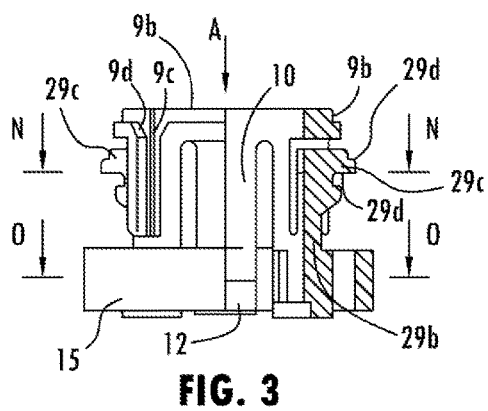
FIG. 3 shows a lateral view, partially in section, of an adapter sleeve according to FIG. 2.

The locking elements 29 are formed in particular by two radially elastically bendable arms 29a running axially parallel to the longitudinal center axis X-X. These arms 29a are arranged respectively offset by 90° with respect to each other towards the locking arms 10. The arms 29a are separated by a U-shaped slot 29b from the wall of the adapter sleeve 7 and are connected as one piece to the wall of the adapter sleeve 7 with their end that faces opposite the direction of insertion Z; see FIGS. 7, 8. The arms 29a have locking cams 29c, which project radially and outwardly at their free ends and also have an inclined surface 29d facing the direction of insertion, as well as a locking surface 29e extending perpendicular to the longitudinal axis X-X, which encloses an acute angle at its outer free end with the inclined surface 29d; see FIG. 3. The peripheral circle on which the locking cams 29c rest with their free ends has a diameter that is larger than the inner diameter of the channel section 6 of the sleeve section 3 and smaller than the outer diameter of the channel section 6. It is practical if a bracing base 29f is formed behind the respective locking cams 10 seen from the direction of insertion. The thickness of the arms 29a is preferably less than the thickness of the wall of the adapter sleeve 7. The spring elasticity of the arms 29a can be adjusted via the length and the thickness of the arms 29a.

The locking cams 29c correspond to recesses 30 in the peripheral wall of the sleeve section 3 in such a way that the adapter sleeve 7 in the sleeve section 3 positively engages the locking cams 29c in the recesses 30 with the adapter sleeve 7 inserted. The recesses 30 are advantageously configured as breakthroughs of the wall of the sleeve section 3. Four recesses 30 arranged offset by 90° with respect to each other are preferably provided in the sleeve section 3. The locking cams 29c are dimensioned in particular in such a way that their free ends do not project out of the breakthroughs 30 when inserted. The adapter sleeve 7 can be inserted in positions mutually rotated by 90° by configuring four recesses 30 that are offset with respect to each other by 90°. It is likewise within the scope of the invention if the breakthroughs 30 are configured as inner indentations, so that the peripheral wall of the sleeve section 3 is closed. Reference can be made to the exemplary embodiment (see FIG. 19) with regard to this.

The locking cams 29c engage with their locking surfaces 29e running perpendicularly to the longitudinal center axis X-X, and the recesses 30 have contact surfaces opposite the locking surfaces 29e, which likewise extend perpendicularly to the longitudinal axis X-X. This configuration of the mutually opposite surfaces causes a positive locking in the axial direction when in locked state. The locking cams 29c and the recesses 30 are suitably adapted to each other in such a way that a twisting of the adapter sleeve 7 becomes impossible in locked state.

The assembly of the adapter sleeve 7 is carried out according to the invention in such a way (see FIG. 1) that first a peripheral seal 26 is inserted into the sleeve section 3. The adapter sleeve 7 is thereafter inserted into the sleeve section 3 until the end of the locking elements, that is the locking cams 29c, are engaged in the recesses 30; see FIG.

7. In the fully assembled plug-in connector according to the invention, the plug shaft 14a is inserted into the mating plug-in connector 14; see FIG. 8. The locking arms 10 are spread apart as a result of this insertion (see FIG. 8) and the annular collar 15 takes on an oval shape; see FIG. 9. This happens in such a way that its outer diameter in the area of the actuating sections 33 is smaller than that in the area of the locking cams 12. The latter is then greater than the outer diameter of the sleeve section 3. The locking cams 12 of the locking arms 10 positively engage in the locking groove 13 of the mating plug-in connector 14 in the inserted state of the mating plug-in connector 14 (see FIG. 10), wherein the annular collar 15 again assumes its original circular shape.

As can be seen in FIGS. 1 to 11, it may be practical according to the invention to displaceably arrange a release safeguard 60 on the outer periphery of the sleeve portion 3 in longitudinal direction of the longitudinal axis X-X. This release safeguard 60 is displaceably mounted between two positions, specifically locking positions. The first position is an assembly position, in which the mating plug-type connector 14 can be inserted into the plug-in connector 1, and specifically into the adapter sleeve 7; see FIGS. 7, 8. The second position is a position in which the release safeguard 60 is pushed in the direction of the annular collar 15 in such a way, that the release safeguard 60 prevents a radial spreading of the locking arms 10; see FIG. 11.

The release safeguard 60 according to this invention preferably consists of a sleeve 61, which positively encloses the socket section 3. This sleeve 61 is displaceably mounted on the sleeve section 3, and specifically between the two aforementioned positions. In the first position, the sleeve 61 is located completely on the sleeve section 3, so that the annular collar 15 is freely accessible and a spreading the locking arms 10 is possible by means of the vertical force P on the annular collar 15 or the locking arms 10 can alternatively be spread during the insertion of the mating plug-in connector 14; see FIG. 8. The sleeve 61 positively locks in this position, for example, with the configured locking lugs 63 configured on its peripheral edge 62, with locking projections 64 located on their ends, that is, releasably in a recess 65 in the peripheral wall of the sleeve section 3. Two locking lugs 63 offset with respect to each other by 180° and two recesses 65 offset with respect to each other by 90° are preferably provided. In the second position, specifically a locking position, the sleeve 61 also encloses the annular collar 15; see FIG. 11. A spreading of the locking arms 10 is hereby no longer possible, so that the undesirable release of the plug-in connection according to the invention, which consists of a plug-in connector 1 and mating plug-in connector 14, is prevented. In this second locking position, the sleeve 61 positively locks with the locking lugs 63 in the recesses 65a, which can coincide with the recesses 30, that are provided in the peripheral wall of the sleeve section 3. The sleeve 61 is suitably provided over its periphery with indentations 66, which are designed in such a way that the protrusions 33a provided on the annular collar 15 reside the indentations 66, so that a displacement of the sleeve 61 is not hindered in this second position. The indentations 66 can be configured, as represented in FIG. 1, as either axial indentations 66 or alternatively as radial indentations of the sleeve wall, so that in this embodiment of the release safeguard 60a, the sleeve wall is closed on the outside and the protrusions 33a are completely enclosed by the indentations 66.

Four longitudinal ribs 67 that are arranged mutually offset by 90° are formed over the outer periphery of the sleeve section 3. In adaptation thereto, the sleeve 61 is provided with guide grooves 68 in its sleeve wall for accommodating the longitudinal ribs 67. A correct insertion of the sleeve 61 on the sleeve section 3 is obtained in this way, if the adapter sleeve 7 has not yet been introduced into the socket section 3; see FIG. 1.

Figure 12:
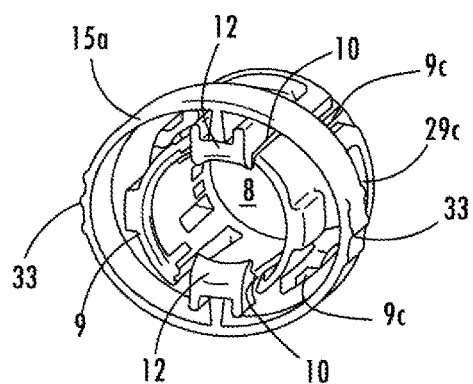
FIG. 12 shows a perspective view of a second embodiment of the adapter sleeve according to the invention.
Figure 13:
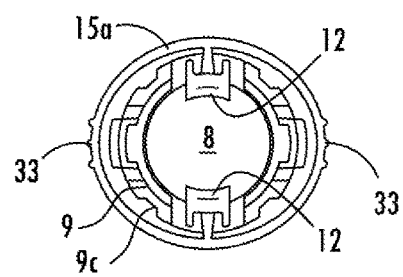
FIG. 13 shows a frontal view of the adapter sleeve according to FIG. 12.

It can be advantageous if the annular collar has a modified shape. The annular collar 15*a* has herein an oval shape in the non-spread position of the locking arms 10; see FIGS. 12, 13, so that the outer diameter of the annular collar 15*a* in the area of the locking cams 12 is smaller than in the area of the actuating sections 33.

Its largest outer diameter is thus configured in the area of the actuating sections 33 and its smallest outer diameter is configured in the area of the locking cams 12, and the largest outer diameter is greater than the outer diameter of the circular peripheral contour of the sleeve section 3, and its smallest external diameter is smaller than the outer diameter of the sleeve section 3.

Figure 14A:
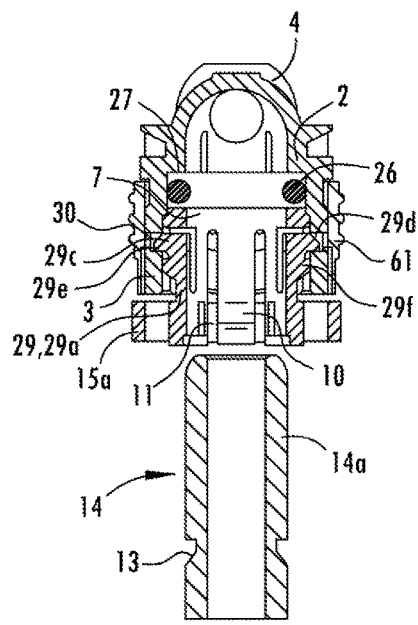
FIG. 14a shows a view according to FIG. 14, but rotated by 90°.
Figure 14:
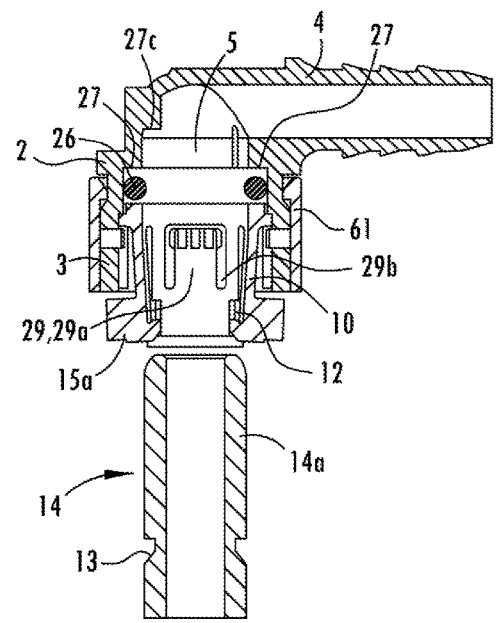
FIG. 14 shows a longitudinal section through the plug-in connection according to the invention in the uninserted state of the mating plug-in connector with an adapter sleeve according to FIG. 12.
Figure 16:
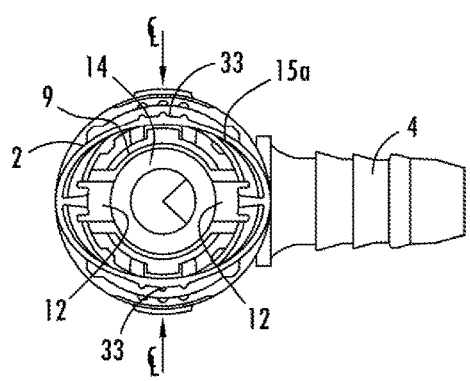
FIG. 16 shows a view according to arrow C in FIG. 15.
Figure 15:
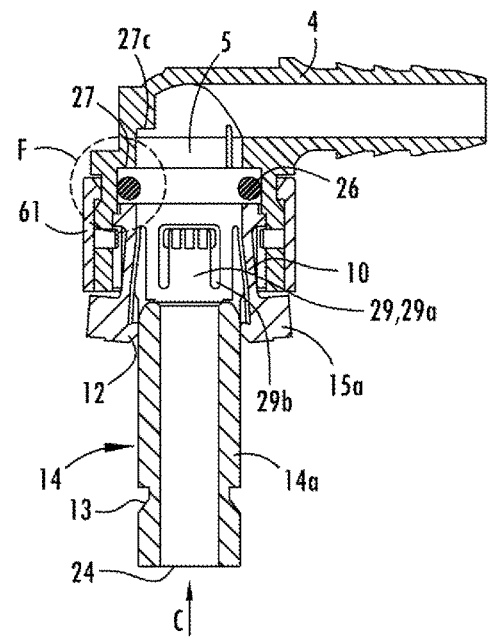
FIG. 15 shows a section corresponding to FIG. 14, but with a partially inserted mating plug-in connector.
Figure 18:
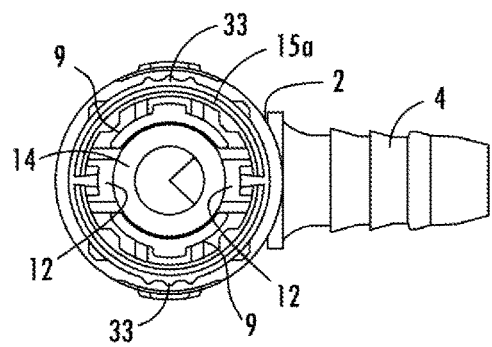
FIG. 18 shows a view according to arrow D in FIG. 17.

The outer diameter of the annular collar 15*a* is hereby greater than the outer diameter of the sleeve section 3 in the area of the actuating sections 33. The radial distance of the locking arms 10 in the area of the locking cams 12 is smaller than the inner diameter of the passage opening 8 in the unassembled state; see FIGS. 14, 14*a*. The locking arms 10 positively engage hereby in the locking groove 13 of the mating plug-in connector when the plug-in connector is inserted (see FIG. 17), on the one hand, and the locking arms 10 are spread in such a way during insertion of the mating plug-in connector 14 with its plug shaft 14*a*, on that other hand, that the annular collar 15*a* assumes an opposite oval peripheral contour, wherein the outer periphery of the annular collar 15*a* projects with respect to the outer periphery of the sleeve section 3, and specifically in the area of the locking cams 12; see FIGS. 15, 16. The radial distance of the locking arms 10, including the locking cams 12, is dimensioned in such a way when locked in the locking groove 13, that the annular collar 15*a* has a circular shape that is such that its outside diameter is smaller than/equal to the outer diameter of the sleeve section 3; see FIGS. 17, 18. The configuration of the annular collar 15*a* makes possible that in the unassembled position of the mating plug-in connector 14 (see FIG. 14*a*) and during the insertion of the mating plug-in connector into the adapter sleeve 7 (see FIG. 15), the sleeve 61, 61*a* cannot be displaced over the annular collar 15*a*, but can be displaced over the annular collar 15*a* into its second position in the inserted state of the mating plug-in connector 14; see FIG. 17. The oval configuration of the annular collar 15*a* thus makes possible, as described above, a double safeguard for the plug-in connection against the undesirable displacement of the sleeve 61 and release of the mating plug-in connector 14 from the plug-in connector 1 according to the invention.

A connection section 24 of the mating plug-in connector 14 can be configured as a connection sleeve for the inserting or screwing-in of a fluid line port or another connector part; see FIG. 1. The connection section 24 can alternatively also be used as a connection pin to plug in a fluid line.

A fluid channel 34, which suitably has an inner channel diameter that corresponds to the inner diameter of the passage channel 5 of the housing 2, runs through the mating plug-in connector 14.

The mating plug-in connector 14 has a plug shaft 14*a* with a circular cross section perpendicular to its center axis. The outer diameter of the plug shaft 23 is greater than a radial distance of the locking cams 12, so that the locking arms 10 are bent radially outwardly during insertion of the plug shaft 23; see regarding this FIGS. 8, 15. The connector shaft 23 is provided with the circumferential locking groove 13 at its front end in the direction of insertion Z. This locking groove 13 has a front contact surface that extends perpendicularly to the center axis X-X, and a contact surface, which contacts with a contact surface of the locking cam 12, which is likewise perpendicular to the longitudinal axis X-X, in such a manner that a positive locking is obtained in the locked state in the axial direction, so that an autonomous release of the connector pin or the plug shaft 14*a* cannot occur under tensile stress. The connection section 24 is provided at the end of the mating plug-in connector 14 opposite the plug-in shaft 14*a* for connection of a fluid line or a unit. An annular shoulder, which can serve as stop, is formed between the connection section 24 and the locking groove 13. The length of the plug shaft 14*a* is especially dimensioned in such a manner that it extends with its free end into the adapter sleeve 7, and from the adapter sleeve 7 to the passage channel 5 of the housing 2 in the inserted state.

Figure 20:
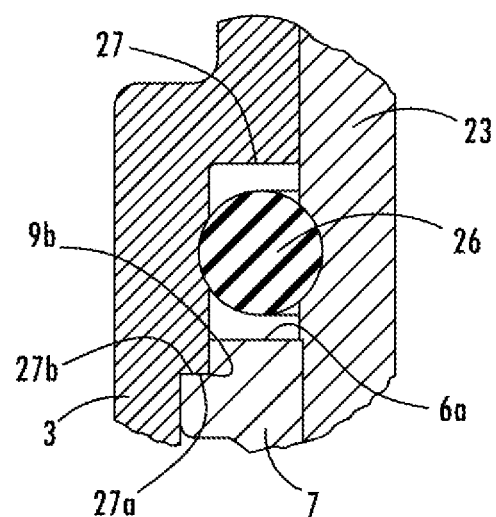
FIG. 20 shows an enlarged view of the detail of a section F in FIG. 15.

It is furthermore suitably provided according to the invention (see FIG. 20) that the peripheral seal 26 is arranged ahead of the adapter sleeve 7 within the sleeve section 3 in direction of insertion Z. This peripheral seal 26 seals the peripheral gap between the plug shaft 14*a* in its inserted state and is encased between an annular shoulder 27 at the transition of the sleeve section 3 and a front end surface 6*a* of the adapter sleeve 7. A receiving groove for the peripheral seal 26 can be omitted because of this embodiment according to the invention, so that the configuration of undercuts is not required in terms of manufacturing technology. The peripheral seal 26 is moreover protected in the interior of the sleeve section 3 in the assembled state of the adapter sleeve 7. The inner diameter of the passage throughflow channel 5 of the housing 2 and the inner diameter of the passage opening 8 of the adapter sleeve 7 are adapted to the outer diameter of the plug shaft 14*a* of the mating plug-in connector 14. The inner diameter of the throughflow channel 5 and the passage opening 8 suitably have the same size. As a result of an elastic deformation of the sealing ring 26, which is caused by the insertion of the plug shaft 14*a*, takes place, on the one hand, a sealing to the outside and, on the other hand, a fixation of the plug shaft 14*a* in the adapter sleeve 7 or in the sleeve section 3 by means of the deformation stress generated inside the O-seal. The annular step 9*b* of the adapter sleeve 7 has a circumferential contact surface 27*a* that runs radially to the longitudinal center axis X-X. As shown in FIG. 20, in particular the channel section 6 has an annular-shaped stop surface 27*b* configured in the sense of a diameter enlargement, which is arranged in such a way that the peripheral seal 26 runs between the annular shoulder 27 and the stop surface 27*b*. The adapter sleeve 7 with its contact surface 27*a* rests against the stop surface 27*b* in the inserted state, and the adapter sleeve 7 projects with its annular step 9*b* into the section 6*a* of the channel section 6, which is sealed by means of the peripheral seal 6 [26].

A geometric termination of the receiver for the peripheral seal 26, a boundary for the plug-in path during assembly of the adapter sleeve 7, a reception and further forwarding of the spreading force as well as a maintaining of a gap between the sleeve section 3 of the housing 2 and of the adapter sleeve 7 take place as a result of the preceding embodiment.

Figure 7:
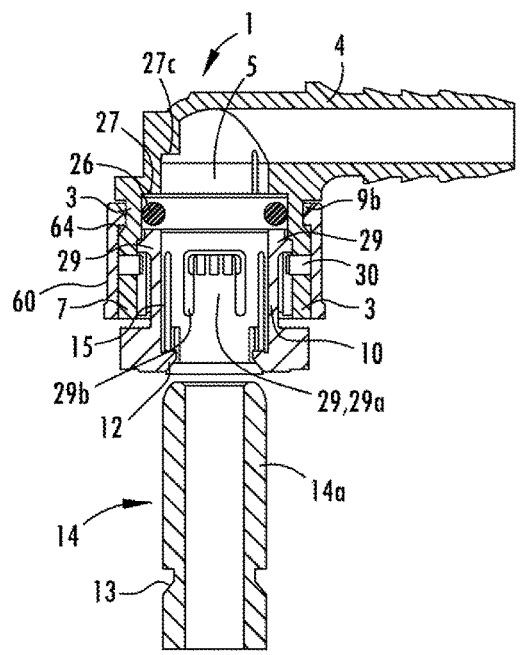
FIG. 7 shows a longitudinal section through the plug-in connector in the inserted state of the adapter sleeve and prior to insertion of the mating plug-in connector, according to this invention.
Figure 8:
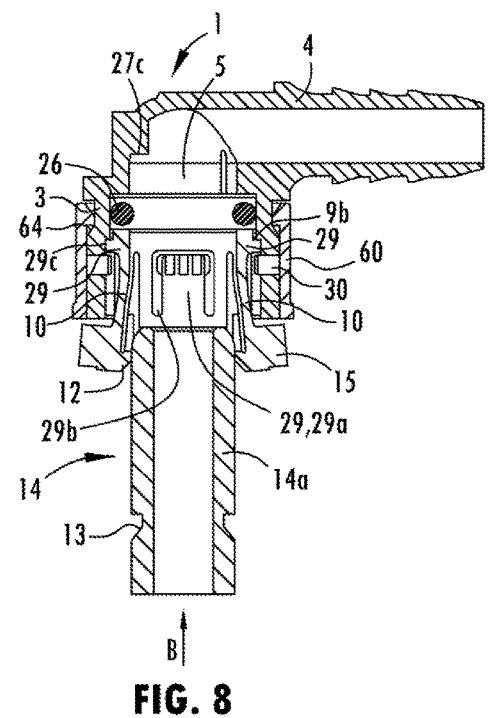
FIG. 8 shows a sectional view in longitudinal section of a plug-in connection of the invention according to FIG. 1 during the insertion operation of the mating plug-in connector.
Figure 9:
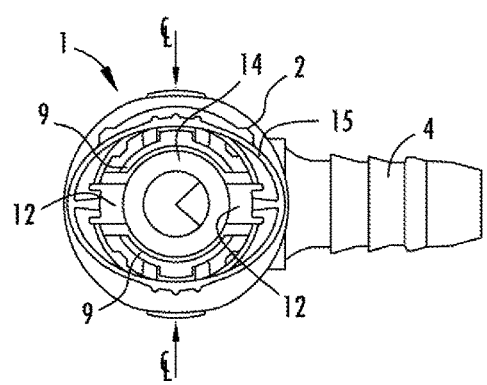
FIG. 9 shows a view according to arrow B in FIG. 8.

It is furthermore advantageous according to the invention if a radially directed stop surface 27*c* is configured in the interior of the passage bore 6 behind the annular shoulder 27 in the sense of a diameter reduction, whereby a depth stop 27*c* is created; see FIGS. 7, 8.

As shown in FIGS. 8, 9 and 15, 16, the annular collar 15, 15a with its sections that are connected to the locking arms 10 projects radially outwardly if the mating plug-in connector 14 is not yet fully inserted, so that the annular collar 15, 15a acquires an oval shape. A visual control as to whether the locking position has been achieved or not is thus provided. When in locking position, the annular collar 15 closes flush with its outer periphery with the outer periphery of the sleeve section 3, wherein the annular collar 15, 15a has then a circular peripheral contour.

Figure 19:
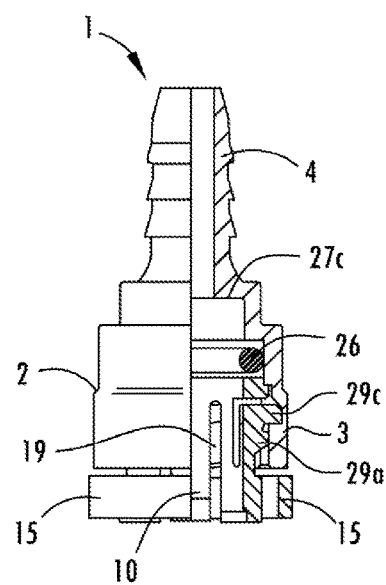
FIG. 19 shows a view, partially in section, of an alternative embodiment of a plug-in connector according to the invention.

In FIG. 19 is depicted an embodiment of the plug-in connector 1, which shows a production by metal cutting. The recesses 30 are not realized hereby as breakthroughs, but rather form a peripheral edge that effects an axial fixing of the adapter sleeve 7. A twisting of the adapter sleeve 7 is however possible.

It is furthermore advantageous according to the invention if the radial height of the stepped surface 9a and the length of the locking arms 10 within the sleeve section 3 is dimensioned in such a way that the radial distance of the locking cams is smaller than the inner diameter of the adapter sleeve 7 and smaller than the outer diameter of the plug shaft 14a of the mating plug-in connector 14.

The present invention also relates to a plug-in coupling consisting of a plug-in connector 1 and a mating plug-type connector 14, such as described above.

Furthermore, as can be seen in FIG. 1, it is practical according to the invention if two diametrically opposite receiving pockets 2a at are configured at the transition of the sleeve section 3 into the remaining plug-in connector housing 2. These receiving pockets 2a serve for accommodating the gripping devices for the assembly of the plug-in connector 1 according to the invention.

The invention is not limited to the depicted and described exemplary embodiments, but also comprises all equally effective embodiments in the sense of the invention. It is explicitly emphasized that the exemplary embodiments are not limited to all features in combination, but that rather each individual partial feature can have inventive importance by itself independently from the others. The invention is moreover also not limited to the feature combination defined in claim 1, but can also be defined by any other combination of specific features of all overall disclosed individual features. This means that, in principle, virtually each individual feature of claim 1 can be omitted or substituted by at least an individual feature disclosed at another point of the application.

The invention claimed is:

1. A plug-in connector assembly for connecting at least one fluid line to another fluid line or to a unit connection, the plug-in connector assembly comprising a housing, a mating plug-in connector and an adapter sleeve, the housing having a passage channel and a sleeve section into which the mating plug-in connector and the adapter sleeve are received, the adapter sleeve configured to releasably engage the mating plug-in connector, the adapter sleeve is retained in the sleeve section by radially elastic positively locking elements and has a passage opening for a plug shaft of the mating plug-in connector, the adapter sleeve further including a locking mechanism formed by at least two locking arms that are radially elastic relative to a longitudinal center axis of the plug-in connector, the locking arms further being defined in a periphery of the adapter sleeve by slot clearances in a wall of the adapter sleeve, and the locking arms have locking cams at free ends thereof that extend radially relative to the longitudinal center axis, the positively locking elements being defined by radially elastic locking extensions provided on an outer periphery of the adapter sleeve between the locking arms, the locking extensions lockingly engage with form-fit stop recesses in a peripheral wall of the sleeve section, wherein the locking cams of the locking arms define a distance to the longitudinal center axis that is smaller than an inner radius of the passage opening and smaller than a radial distance from the longitudinal center axis to the locking arms in an area immediately adjacent to the locking cams, the radial distance being equal to or less than the inner radius of the passage opening, the mating plug-in connector including a locking groove, the locking cams being engaged in the locking groove and locking the mating plug-in connector to the adapter sleeve, the adapter sleeve including an annular collar provided along a rear opening edge of the passage opening when seen from a direction of insertion, the annular collar and the locking cams being located outside of the housing and the sleeve section with the adapter sleeve inserted in the passage channel thereof.

2. The plug-in connector assembly according to claim 1, wherein the positive locking elements are positively fixed in the recesses in the peripheral direction of the adapter sleeve, the adapter sleeve including four of the recesses, which are mutually offset by 90°.

3. The plug-in connector assembly according to claim 1, wherein the annular collar is circular-shaped and its outer diameter is equal in size to an outer diameter of a circular peripheral contour of the sleeve section.

4. The plug-in connector assembly according to claim 1, wherein when the mating plug-in connector is not fully engaged with the adapter sleeve the annular collar has an oval shape and includes actuating sections located at a largest outer diameter of the annular collar, a smallest outer diameter of the annular collar being located adjacent to the locking cams, the largest outer diameter of the annular collar is greater than an outer diameter of a circular peripheral contour of the sleeve section and the smallest external diameter of the annular collar is smaller than the outer diameter of the sleeve section, wherein the locking arms proceed radially inwardly at the free ends on which the locking cams are located in such way that a radial distance between the locking arms is smaller than an inner diameter of the passage opening, and wherein when the mating plug-in connected is fully engaged with the adapter sleeve with the locking cams in a locking position within locking recesses provided on the mating plug-in connector the annular collar has a circular peripheral contour with an outer diameter that is less than or equal to an outer diameter of the sleeve section.

5. The plug-in connector assembly according to claim 1, the locking arms have a radial thickness that is less than the wall thickness of the adapter sleeve thereby defining a stepped surface extending radially in direction to the longitudinal center axis and provided between an outer periphery of the adapter sleeve and an outer periphery of the locking arms.

6. The plug-in connector assembly according to claim 5, wherein a radial height of the stepped surface and a length of the locking arms within the sleeve section have dimensions such that a radially outwardly directed spring path of the locking cams is created in such a way that a radially outwardly spread of the locking cams defines a radial distance to the longitudinal center axis that is at least equal to an inner radius of the passage opening of the adapter sleeve and at least equal to an outer radius of a plug shaft of the mating plug-in connector.

7. The plug-in connector assembly according to claim 1, wherein the locking extensions are formed as radially elastically bendable arms extending parallel to the longitudinal center axis and located diametrically opposite to each other, the elastically bendable arms being offset by 90° with respect to the locking arms and have radially outwardly projecting locking cams on free ends that face in the insertion direction.

8. The plug-in connector assembly according to claim 7, wherein the elastically bendable arms are separated from the wall of the adapter sleeve by a U-shaped slot and are connected as one piece to the wall of the adapter sleeve with an end thereof that faces opposite to the direction of insertion.

9. The plug-in connector assembly (1) according to claim 7, wherein the projecting locking cams each have an inclined surface facing in the direction of insertion and a locking surface facing opposite to the direction of insertion, the locking surface extending perpendicularly to the longitudinal center axis.

10. The plug-in connector assembly according to claim 7, wherein the projecting locking cams define a peripheral circle with a diameter that is smaller than an outer diameter of the sleeve section and larger than an inner diameter of a channel section of the sleeve section.

11. The plug-in connector assembly according to claim 7, wherein a thickness of the elastically bendable arms is less than a thickness of a wall of the adapter sleeve.

12. The plug-in connector assembly according to claim 1, wherein the locking arms are connected to the annular collar in an area adjacent to the locking cams and are separated from the annular collar in a remaining peripheral area by a peripheral gap section.

13. The plug-in connector assembly according to claim 12, wherein the annular collar is provided with deformation sections located centrally between the locking arms, the deformations sections being inwardly deformable under a force directed toward the longitudinal center axis and configured to produce a radially outwardly directed spreading of the locking arms in such way that a radial distance of the locking cams from the longitudinal center axis is equal to an inner radius of the passage opening.

14. The plug-in connector assembly according to claim 1, wherein a peripheral seal is provided ahead of the adapter sleeve in the direction of insertion into the sleeve section and sealing a peripheral gap between an inner wall of the sleeve section and a plug shaft of the mating plug-in connector.

15. The plug-in connector assembly according to claim 14, wherein an annular shoulder is configured in the sleeve section at a transition between an expanded diameter channel section and the passage channel, and the peripheral seal being encased between the annular shoulder and an insertion end surface of the adapter sleeve.

16. The plug-in connector assembly according to claim 1, wherein an annular step is configured in the direction of insertion by means of a diameter reduction of the adapter sleeve at an insertion end of the adapter sleeve, and wherein guide grooves are formed in a periphery of the adapter sleeve and extend parallel to the longitudinal center axis starting from the annular step, the guide grooves having a groove base located at a same radius from the longitudinal center axis as a periphery of the annular step, wherein the guide grooves accommodate and receive guiding ribs formed on an inner wall of a channel section of the sleeve section.

17. The plug-in connector assembly according to claim 16, wherein the annular step of the adapter sleeve has a circumferential contact surface extending radially to the longitudinal center axis, the channel section defining an annular stop surface opposing the contact surface, wherein, the adapter sleeve rests with its contact surface against the stop surface in the inserted state of the adapter sleeve.

18. The plug-in connector assembly according to claim 1, further comprising a release safeguard displaceably arranged over an outer periphery of the sleeve section in the longitudinal direction and moveable between first and second positions, when in the second position the release safeguard obstructing radially outward spreading of the locking arms and when in the first position the release safeguard not obstructing radially outward spreading of the locking arms.

19. The plug-in connector assembly according to claim 18, wherein the release safeguard is formed as a sleeve that encases the sleeve section, the sleeve having locking tongues over its peripheral edge in the direction of insertion, the locking tongues being received in lock recesses defined in a peripheral wall of the sleeve section in the second position.

20. The plug-in connector assembly according to claim 19, wherein the sleeve encloses an annular collar provided on an end of the adapter sleeve in the second position.

21. The plug-in connector assembly according to claim 20, wherein the sleeve has indentations that define a free space in which are received actuating sections defined on the annular collar, the actuating sections being coupled to the locking arms and configured to produce outward spreading of the locking arms during inward movement of the actuating sections.

22. The plug-in connector assembly according to claim 1, wherein the stop recesses are configured as one of passage openings and peripherally closed recesses in a peripheral wall of the sleeve section.

23. The plug-in connector assembly according to claim 1, wherein the housing include diametrically opposite pockets adjacent to the sleeve section and configured for accommodating gripping devices.

* * * * *